United States Patent
Chandan et al.

(10) Patent No.: US 9,847,660 B2
(45) Date of Patent: Dec. 19, 2017

(54) MANAGING A PICOGRID WITH A COMPUTING DEVICE

(71) Applicants: International Business Machines Corporation, Armonk, NY (US); Universiti Brunei Darussalam, Gadong (BN)

(72) Inventors: Vikas Chandan, Bangalore (IN); Zainul M. Charbiwala, Bangalore (IN); Tanuja H. Ganu, Bangalore (IN); Sunil Ghai, Bangalore (IN); Sandeep Kalra, Amherst, MA (US); Harshad D. Khadilkar, Bangalore (IN); Ming Chee Lim, Gadong (BN); Devasenapathi P. Seetharamakrish, Bangalore (IN)

(73) Assignees: International Business Machines Corporation, Armonk, NY (US); Universiti Brunei Darussalam, Muara (BN)

( * ) Notice: Subject to any disclaimer, the term of this patent is extended or adjusted under 35 U.S.C. 154(b) by 551 days.

(21) Appl. No.: 14/295,581

(22) Filed: Jun. 4, 2014

(65) Prior Publication Data
US 2015/0357848 A1    Dec. 10, 2015

(51) Int. Cl.
  *H02J 7/00*    (2006.01)
  *G06F 1/26*    (2006.01)

(52) U.S. Cl.
  CPC .............. *H02J 7/0052* (2013.01); *G06F 1/26* (2013.01); *H02J 7/0073* (2013.01); *H02J 2007/006* (2013.01)

(58) Field of Classification Search
  CPC .......... G02F 1/26; H02J 7/0052; H02J 7/0073; H02J 2007/006
  See application file for complete search history.

(56) References Cited

U.S. PATENT DOCUMENTS

| 6,531,845 B2 | 3/2003 | Kerai et al. |
| 7,191,077 B2 | 3/2007 | Mese et al. |

(Continued)

FOREIGN PATENT DOCUMENTS

| CA | 2653778 C | 3/2013 |
| CN | 201523245 U | 7/2010 |

(Continued)

OTHER PUBLICATIONS

Gahi, S. K., Mylavarapu, S. & Kunnath, R. (2013). "DC Picogrids: A Case for Local Energy Storage for Uniterrupted Power to DC Appliances". , e-Energy, May 21-24, 2013. 27-38. Print.*

(Continued)

*Primary Examiner* — Jennifer L Norton
(74) *Attorney, Agent, or Firm* — Ryan, Mason & Lewis, LLP

(57) ABSTRACT

Methods, systems, and computer program products for managing a picogrid with a computing device are provided herein. A method includes generating one or more power-related models based on (i) data pertaining to a given device battery, (ii) data pertaining to one or more context sources, and (iii) one or more items of power-related historical data; determining a charging schedule for the given device battery to provision power for a picogrid based on the one or more power-related models, wherein said picogrid comprises a set of one or more additional devices connected to (i) the given device and (ii) an energy storage component; and implementing the charging schedule on the given device.

15 Claims, 6 Drawing Sheets

(56) References Cited

U.S. PATENT DOCUMENTS

| | | | | |
|---|---|---|---|---|
| 2005/0134225 | A1* | 6/2005 | Mese | H01M 10/42 320/132 |
| 2008/0136371 | A1* | 6/2008 | Sutardja | B60L 11/1816 320/109 |
| 2008/0218126 | A1 | 9/2008 | Bansal et al. | |
| 2010/0123436 | A1* | 5/2010 | Herrod | H02J 7/0052 320/132 |
| 2010/0179704 | A1* | 7/2010 | Ozog | G06Q 10/06315 700/291 |
| 2010/0253281 | A1* | 10/2010 | Li | H02J 7/0027 320/108 |
| 2012/0074910 | A1 | 3/2012 | Piccolotto | |
| 2012/0203392 | A1* | 8/2012 | Pandy | H02J 3/32 700/296 |
| 2013/0054045 | A1* | 2/2013 | Ramezani | B60L 11/1844 700/297 |
| 2014/0028254 | A1* | 1/2014 | Shane | H02J 3/14 320/109 |
| 2014/0091747 | A1* | 4/2014 | Uyeki | B60L 11/184 320/101 |
| 2015/0324817 | A1* | 11/2015 | Chen | G06Q 30/0202 705/7.31 |
| 2016/0079787 | A1* | 3/2016 | Yechieli | G06F 1/26 320/107 |

FOREIGN PATENT DOCUMENTS

| | | |
|---|---|---|
| CN | 201994379 U | 9/2011 |
| WO | 2010056488 A1 | 5/2010 |

OTHER PUBLICATIONS

The Economist, "Edison's Revenge," http://www.economist.com/news/international/21588104-humble-usb-cable-part-electrical-revolution-it-will-make-power-supplies?frsc=dg%7Ca Oct. 19, 2013.

Singh et al., "DC Microgrids and the Virtues of Local Electricity," IEEE Spectrum, Feb. 6, 2014, http://spectrum.ieee.org/green-tech/buildings/dc-microgrids-and-the-virtues-of-local-electricity/?utm_source=energywise&utm_medium=email&utm_campaign=021214.

Samsung, Tips & Tricks: Extending Notebook Battery Life, http://www.samsung.com/us/article/tips--tricks-extending-notebook-battery , Sep. 10, 2012.

Jiang et al., Experiences with a high-fidelity wireless building energy auditing network, in ACM Conference on Embedded Networked Sensor Systems, 2009.

Dawson-Haggerty et al., @scale: Insights from a large, long-lived appliance energy WSN, in International conference Information Processing in Sensor Networks, 2012.

Mishra et al., Smartcharge: cutting the electricity bill in smart homes with energy storage, in Proceedings of the 3rd International Conference on Future Energy Systems: Where Energy, Computing and Communication Meet. ACM, 2012.

Ghai et al., "DC picogrids: A case for local energy storage for uninterrupted power to DC appliances," in e-energy, 2013.

Samsung, "What is Easy Battery Manager." Available: http://support-us.samsung.com/cyber/popup/iframe/poptroubleshooting fr.jsp?idx=47830&modelname=NP-Q1, Oct. 28, 2008.

Fatbatt. Available: https://web.archive.org/web/20131231105048/http://fatbatt.com/, Dec. 31, 2013.

Murthy et al., "Energy-agile laptops: Demand response of mobile plug loads using sensor/actuator networks," in 2012 IEEE Third International Conference on Smart Grid Communications. IEEE, 2012, pp. 581{586.

Maly et al., "Optimal battery energy storage system (BESS) charge scheduling with dynamic programming," IEE Proceedings on Science, Measurement and Technology, vol. 142, No. 6, pp. 453-458, Nov. 1995.

Govindan et al., "Agressive datacenter power provisioning with batteries," ACM Transactions on Computer Systems, vol. 31, No. 1, pp. 2:1{2:31, Feb. 2013.

Kliazovich et al., "DENS: Data center energy-efficient network-aware scheduling," in IEEE/ACM International Conference on Green Computing and Communications, 2010.

Das et al., "Utility-function-driven energy-efficient cooling in data centers," in International Conference on Autonomic Computing, 2010.

Thanayankizil et al., "SoftGreen: Towards energy management of green office buildings with soft sensors," in 6th International Conference on Communication Systems and Networks, 2012.

Ganu et al., "nPlug: An autonomous peak load controller," IEEE Journal on Selected Areas in Communications, vol. 31, No. 7, pp. 1205-1218, Jul. 2013.

Smart Battery Data Specification, Revision 1.1. Available: http://sbs-forum.org/specs/sbdat110.pdf, Dec. 11, 1998.

Sarasua et al., Dynamic modelling of advanced battery energy storage system for grid-tied AC microgrid applications, 2013. Available: http://www.intechopen.com/books/energy-storage-technologies-and-applications.

USB Implementers Forum, Inc., Press release: USB-IF certifies super-speed USB 3.0 products, San Francisco, CA, Tech. Rep., Sep. 10, 2013.

Banerjee, R., "Comparison of options for distributed generation in India," Energy Policy, vol. 34, No. 1, pp. 101-111, 2006.

Bertsekas, D., Dynamic Programming and Optimal Control, 3rd ed. Cambridge, MA: Athena Scientific, 2005, vol. 1, ch. 2, pp. 64-67.

ASHRAE Standard 55-2010. Thermal Environmental Conditions for Human Occupancy. Available: https://www.ashrae.org/resources--publications/bookstore/standard-55.

Gao et al., "Spot: a smart personalized office thermal control system," in Proceedings of the fourth international conference on Future energy systems. ACM, 2013, pp. 237-246.

* cited by examiner

MANAGING A PICOGRID WITH A COMPUTING DEVICE

FIELD OF THE INVENTION

Embodiments of the invention generally relate to information technology, and, more particularly, to power-related technology.

BACKGROUND

Many geographic regions (including, for example, developing countries) suffer from intense electricity deficits. To manage such deficits, electricity suppliers commonly induce periods (for example, multiple hours) of power cuts per day. Commercial office buildings, by way of example, are particularly impacted by such power cuts, as office buildings routinely consume significant amounts of energy during normal operation. Many commercial office buildings faced with such power cuts utilize a backup power source such as a diesel generator (DG) and/or an inverter with a battery to power essential loads (such as lights and fans) during power cuts. However, DGs require periodic fuel refills and can generate fumes. Moreover, due to variability in local fuel prices, electricity generated by DGs can often be expensive. Compared to DGs, inverter backups do not require fuel and produce no fumes. However, inverter backups incur additional costs due to round-trip losses resulting from transitions from alternating current (AC) to direct current (DC) and back to AC, and due to the limited lifetimes of inverters and batteries.

Additionally, office buildings are also commonly exposed to differential electricity prices not only because of power cuts but also due to time-of-use (ToU) prices set by utilities and/or due to intermittent energy supplied by renewable sources. Accordingly, a need exists for inexpensive techniques for powering essential loads during high-cost hours in settings such as commercial office buildings.

SUMMARY

In one aspect of the present invention, techniques for managing a picogrid with a computing device are provided. An exemplary computer-implemented method can include steps of generating one or more power-related models based on (i) data pertaining to a given device battery, (ii) data pertaining to one or more context sources, and (iii) one or more items of power-related historical data; determining a charging schedule for the given device battery to provision power for a picogrid based on the one or more power-related models, wherein said picogrid comprises a set of one or more additional devices connected to (i) the given device and (ii) an energy storage component; and implementing the charging schedule on the given device.

In another aspect of the invention, an exemplary computer-implemented method can include steps of generating (i) a user computing device battery model, (ii) a user preferences model, and (iii) an energy pricing model based on data collected from multiple power-related sources; determining a charging schedule for the user computing device battery to provision power for a picogrid based on (i) the user computing device battery model, (ii) the user preferences model, and (iii) the energy pricing model, wherein said picogrid comprises a set of one or more devices connected to the user computing device; implementing the charging schedule on the user computing device; and updating the charging schedule in response to one or more changed parameters.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
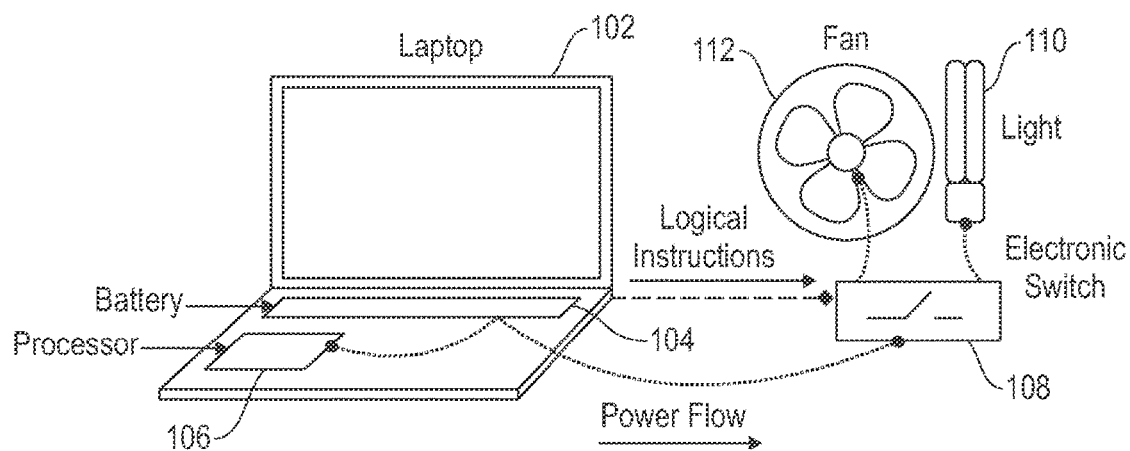
FIG. 1 is a diagram illustrating an example architecture for a picogrid, according to an embodiment of the present invention.

As described herein, an aspect of the present invention includes managing the operation of a picogrid with a computing device. As used herein, a picogrid includes a set of devices connected to a power source and wherein the picogrid has its own dedicated energy storage device. By way of example, at least one embodiment of the invention includes a DC picogrid which includes a combination of local energy storage (such as batteries, which may be included with a computing device such as in a laptop) and personal DC appliances such as light-emitting diode (LED) lights and/or DC fans. In such an example, the DC appliances are powered by a computing device battery when there is a grid power outage and a (potentially expensive) backup source is otherwise providing electricity. Cost savings are realized through multiple mechanisms, including, for example: (i) by reducing the dependence on high-power functions such as lighting and air conditioning during high-cost hours, and (ii) by leveraging the variable cost of energy for charging the computing device battery over the course of the day.

Also, in one or more embodiments of the invention, a picogrid can be used as a stand-alone personal system, and/or it can be used to supplement or replace a central lighting and heating system. As further described via examples herein, laptop processors are used as representative computing devices and laptop batteries as representative energy storage devices, with such a combination being referred to as a laptop-managed picogrid. However, it is to be appreciated that one or more embodiments of the invention can be extended or modified to include a combination of any computing device controlling the status of any energy storage component. For instance, it is noted that other portable computing devices can be used (that is, in lieu of or in addition to a laptop) in connection with one or more embodiments of the invention. Such portable computing devices can include, for example, tablets and/or devices that have sufficient battery capacity to power a picogrid.

As further illustrated herein, an example embodiment of the invention can include a DC supply provided to one or more devices of a picogrid by a laptop battery and/or by an external storage controlled by a computing platform. As further described herein, such an embodiment can include performing charge management of the laptop battery to provision sufficient energy for powering the picogrid while satisfying one or more performance constraints.

One aspect of the invention includes a data-driven framework for modelling battery characteristics, wherein such models can be used to define the state dynamics for an optimization algorithm, such as detailed further herein. Modelling includes a data collection phase. In an example embodiment of the invention, a data collection protocol can be implemented in the background of a given device (such as a laptop) without the need for user interaction. A data collection phase can include collecting battery data at a defined interval (for example, every minute), and periodically uploading the collected data to a central server or locally within the device. Such battery data to be collected can include both static (for example, manufacturer information) and dynamic (for example, charge level) data sets for the given battery. A glossary of example fields relevant to battery modelling includes the following:

| Field | Symbol | Units |
| --- | --- | --- |
| Charge Rate | $P_{ch,i}$ | Watts (W) |
| Discharge Rate | $P_{dch,i}$ | W |
| Charge Remaining | $x_i$ | (fraction) |
| Battery Capacity | $E_{max}$ | Watt-hour (Wh) |

By way of further illustration, consider the following example, wherein an initial assumption is made that the charging rate of a battery (such as, for example, a Lithium-ion battery) is a function of the battery's state of charge (SOC) at any given instant. To quantify this dependency, obtained charging rate data can be plotted against a normalized SOC (the ratio of the actual state of charge to the battery capacity) of the battery. Regression analysis can then be used to develop a mathematical model of the charging rate as a function of the normalized SOC. In the following equation, $P_{ch,n}$ denotes the charging rate of the nth laptop battery and $x_n$ denotes its normalized SOC. As detailed herein, the underlying mathematical model is assumed to be piece-wise linear. The constants $a_{1,n}$, $a_{2,n}$, $a_{3,n}$ and $c_n$ are obtained from the noted regression analysis:

$$P_{ch,n} = \begin{cases} a_{1,n} \cdot x_n + a_{2,n} & 0 \leq x_n < c_n \\ a_{3,n} \cdot (1 - x_n) & c_n \leq x_n < 1 \end{cases} \quad (1)$$

Note that in the above model, $P_{ch,n}=0$ when $x_n=1$. This is consistent with the fact that when the battery is charged to its maximum capacity, no power is drawn for charging the battery even when the laptop is plugged-in.

During discharge, the battery provides power to laptop components such as the processors, display, cooling fans and a graphics processing unit (GPU) (also cumulatively referred to herein as a processor load), as well as any external devices connected to the laptop. In an example embodiment of the invention, it is assumed that the discharge rate for a given laptop battery is nearly uniform over time. Therefore, in such an embodiment, the power consumption $P_{comp,n}$ by the processor load is modelled to be constant and nominally equal to the mean discharge rate observed using historical data.

Additionally, at least one embodiment of the invention includes generating and/or implementing an optimization algorithm for a picogrid architecture. The algorithm can be, by way of example, embedded in the software of the corresponding device (such as a laptop) and utilize a combination of models (such as detailed above) and a schedule of power costs for a given time period (for example, over the course of a day) to compute charge and/or discharge decisions for the battery.

By way merely of illustration, consider a picogrid architecture that incorporates universal serial bus (USB) specifications, and that USB ports on the laptop have a power rating sufficient to run a small fan and an LED light. Accordingly, FIG. 1 is a diagram illustrating an example architecture for a picogrid, according to an embodiment of the present invention.

By way of illustration, FIG. 1 depicts a fan 112 and a light 110 directly powered from a laptop 102 via an electronic switch 108. As also depicted in FIG. 1, the laptop 102, which includes a battery 104 and a processor 106, outputs power flow and logical instructions to the electronic switch 108. In at least one embodiment of the invention, the electronic switch 108, which is implemented to change the on-off status of the devices (that is, the fan 112 and the light 110) can be implemented in the form of software.

As noted above, the battery charging rate for any laptop can be given by Equation (1). As such, by way of further illustration, let the threshold for a power cost above which the picogrid devices are activated be equal to $n_{th}$ and the combined power drawn by the devices be equal to $P_{dev}$. In the following example, the n subscript which was used for indexing the laptops above has been dropped because the problem in the following illustration is being formulated for a single laptop. Accordingly, the time period of optimization is discretized into N intervals, and the subscript i is used to index all quantities by time period. Also, the binary variable $w_{dev,i}$ is i defined to be equal to 1 when the effective power cost in time period i, $\eta_i \geq n_{th}$ and 0 otherwise. Additionally, the battery discharge rate $P_{dch,i}$ is given by Equation (2) below:

$$P_{dch,i} = P_{comp,i} + w_{dev,i} \cdot P_{dev} \quad (2)$$

Further, at least one embodiment of the invention can include defining the decision variable for drawing power from the plug during time period $t_i$ to be $u_{plug,i}$. If the maximum energy capacity of the battery is given by $E_{max}$ and each time interval is of length $\Delta T$, the total power drawn from the plug in period $t_i$ is given by Equation (3) and the state (normalized SOC) update for the next time step is given by Equation (4), as follows:

$$P_{plug,i} = u_{plug,i} \cdot [P_{ch,i} + P_{dch,i}] \quad (3)$$

$$x_{i+1} = x_i + \frac{u_{plug,i} \cdot P_{ch,i} - (1 - u_{plug,i}) \cdot P_{dch,i}}{E_{max}} \Delta T \quad (4)$$

The total cost over the optimization time window is the sum of the energy consumed during each time interval of length $\Delta T$, scaled by the corresponding power cost $\eta_i$. This is formulated in Equation (5) below, with the total number of time periods in the optimization window being N:

$$J = \Sigma_{i=1}^{N} u_{plug,i} \cdot [P_{ch,i} + P_{comp,i} + w_{dev,i} \cdot P_{dev}] \cdot \Delta T \quad (5)$$

An optimum charge and/or discharge policy is one that minimizes J over the decision variable space defined by $u_{plug,i}$ with $i \in \{1, 2, \ldots, N\}$, subject to the dynamics defined by Equation (4) and the following constraints:

$$u_{plug,i} \in \{0, 1\} \quad \text{Binary decision variable, and}$$

$$x_i \geq \frac{T_{res} \cdot (P_{comp,i} + P_{dev})}{E_{max}} \quad \text{Minimum charge level.}$$

The minimum charge constraint is based on a user-defined threshold for the minimum battery reserve time that is maintained by the algorithm, $T_{res}$. The scaling factor for $T_{res}$ is calculated assuming that this reserve time is to be maintained even with the devices running. Additionally, the power cost schedule can be obtained, for example, from the utility provider (such as from the provider's website).

Additionally, as described herein, at least one embodiment of the invention includes generating and/or implementing an algorithm that is adaptable to a vast number of combinations of cost levels and/or pricing schedules and times, while still realizing a maximum cost reduction. A goal of such an algorithm includes computing the decisions for controlling the state of a given battery over the length of a given look-ahead window. Therefore, there are two natural state variables in the problem: x (the normalized SOC) and t (time). In an example embodiment of the invention, both variables are discretized to some desired level of granularity. The minimum time to discharge $T_{res}$ can be converted to a minimum SOC constraint using the discharge rate ($P_{comp,i}$+ $P_{dev}$). Assuming that the SOC at the start of optimization window $x(t_1)$ is known, the state dynamics can be propagated forward.

Also, the reachable portion of the state space can be defined by the initial state and the battery dynamics. One boundary of the reachable state space can be realized by assigning $u_{plug,i} = 1 \; \forall_i$. Another boundary can be realized by discharging the battery to its minimum acceptable SOC and keeping the battery close to this value using short charge/discharge cycles. This minimum SOC cannot be kept constant because of the integer nature of the decision variable $u_{plug,i}$. All other SOC trajectories are to remain within the two boundaries defined above.

The computational complexity of the algorithm scales linearly with the length of the time window and the level of discretization. The minimum cost trajectory within the feasible set described above can be obtained by framing the problem as a shortest-path problem, and solving the problem using Djikstra's algorithm (which is to be appreciated by one skilled in the art). By way of illustration, assume that x (the normalized SOC) belongs to a discrete set of size K, and that the optimization time window is discretized into N time periods. As such, the following matrices of size K×(N+1) are defined, with the (N+1)$^{th}$ column representing the end of the final time period:

C, with each element containing the minimum cost to reach state $(x(t_i), t_i)$, wherein i is an integer, $1 \leq i \leq (N+1)$;

P, with each element containing the SOC at time step $t_{i-1}$ on the optimal path from $(x(t_j), t_j)$ to $(x(t_i), t_i)$; and D, containing the decision taken at time step on the optimal path from $(x(t_j), t_j)$ to $(x(t_i), t_i)$.

The initial value of all entries in C is ∞, except for the initial state $(x(t_1), t_1)$. The algorithm begins by enumerating all decisions that can be taken at this initial state. With one decision variable $u_{plug,1}$ that can take two values, the number of available decisions is two. This leads to two potential destination states at the time stage $t_2$. Also, the cost to reach these states is a function of $u_{plug,1}$, and is given by the corresponding term in Equation (5). Further, the elements of C, P and D corresponding to the two potential destination states are updated appropriately.

Proceeding similarly, the algorithm enumerates the decisions that can be taken at all reachable states at time $t_i$, $1 \leq i \leq N$. However, not all states at a given stage $t_i$ are reachable, either because no combination of decisions from the initial state arrives at the given state, or because reaching the state(s) is prohibited by one or more constraints. If a given state is reachable through more than one combination of decisions, only the lowest-cost path is saved. Initializing all elements of C to ∞ ensures that the first feasible path arriving at any state is saved.

Because the maximum number of reachable states is upper bounded by the total number of states KN, and the maximum number of feasible decisions at any state is two, the maximum number of cost evaluations required in the computation phase of the algorithm is 2KN. The computational complexity of the algorithm thus scales linearly with both K and N. Once all decisions at time stage $t_N$ have been evaluated, the optimum solution can be determined by selecting the minimum entry in the (N+1)$^{th}$ column of C and following the path and decision matrices backwards starting from this entry.

At least one embodiment of the invention can also include consideration of additional state constraints. For example, the final state of charge may be constrained to be equal to the initial state of charge in order to maintain day-to-day continuity. Such a constraint can be incorporated by identifying the shortest path from $(x(t_1), t_1)$ to $(x(t_1), t_{N+1})$. Other types of state constraints may be similarly imposed, either in the form of a range of acceptable final SOCs or in the form of fixed values for the decision variables $u_{plug,i}$ for some $t_i$. An effect of such constraints on the optimization algorithm includes the elimination of the affected state trajectories from the search space.

Figure 2:
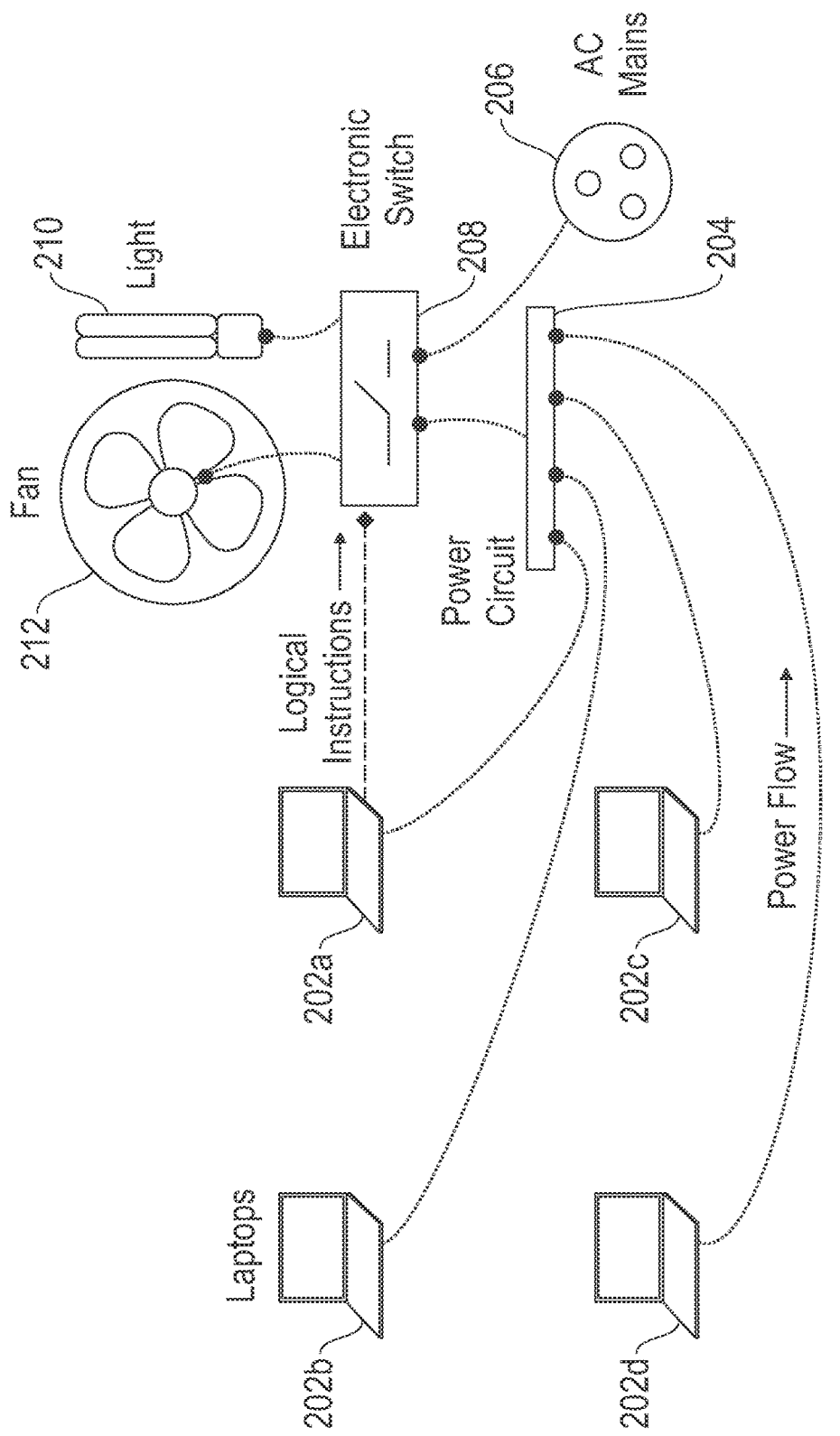
FIG. 2 is a diagram illustrating example picogrid architecture wherein multiple laptops pool their battery capability to provide power to a fan and a light, according to an embodiment of the present invention.
Figure 3:
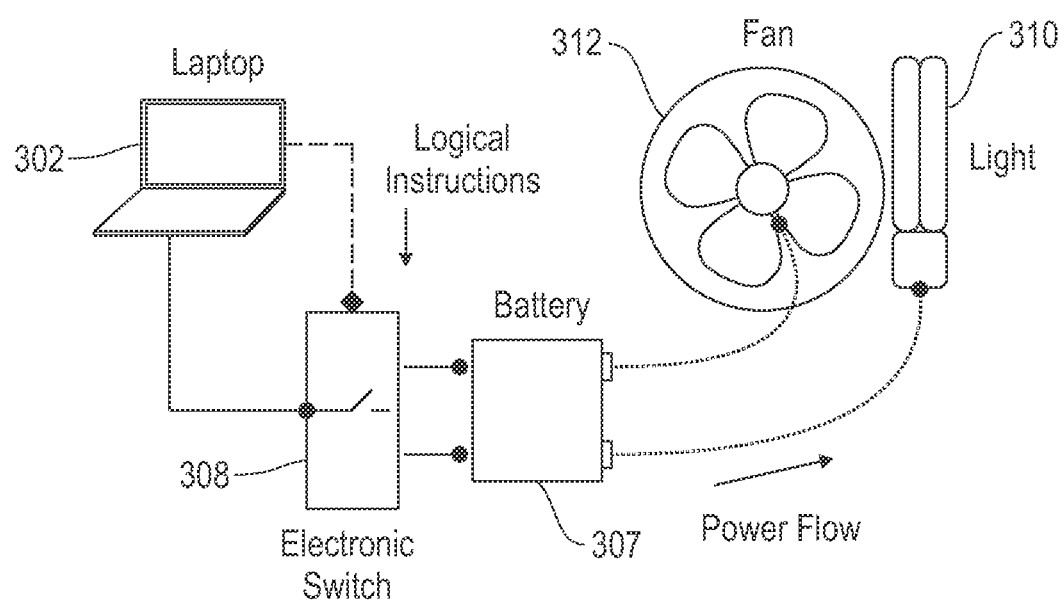
FIG. 3 is a diagram illustrating example picogrid architecture with additional battery storage for the fan and the light, according to an embodiment of the invention.

Additionally, in at least one embodiment of the invention, a picogrid includes the pooling of resources from multiple laptops (such as depicted in FIG. 2) or by introducing an intermediate power storage device (such as depicted in FIG. 3). The optimization formulation for the FIG. 2 embodiment is similar to the optimization formulation described above.

FIG. 2 is a diagram illustrating example picogrid architecture wherein multiple laptops pool their battery capability to provide power to a fan and a light, according to an embodiment of the present invention. By way of illustration, FIG. 2 depicts a collection of laptops, namely, laptops 202a, 202b, 202c and 202d (referred to herein collectively as laptop collection 202). FIG. 2 also depicts a fan 212 and a light 210 powered from the laptop collection 202 via a power circuit 204 and an electronic switch 208. Specifically, the laptop collection 202 outputs power flow to the power circuit 204 and outputs logical instructions to the electronic switch 208.

When the number of laptops that are plugged-in is insufficient for powering the other devices of the picogrid, the electronic switch 208 can draw power from AC mains (plug) 206. Such an architecture can also be implemented, by way of example, using a setup modelled on a grid-tied inverter, which performs a similar function.

FIG. 3 is a diagram illustrating example picogrid architecture with additional battery storage for the fan and the light, according to an embodiment of the invention. By way of illustration, FIG. 3 depicts a fan 312 and a light 310 powered from laptop 302 via an electronic switch 308 and a battery 307. Specifically, the laptop 302 outputs power flow and logical instructions to the electronic switch 308, which interacts with the battery 307 to provide power flow to the fan 312 and the light 310. Additionally, the laptop 302 can open and close the electronic switch 308, which controls battery discharging and charging, respectively.

By way of example, battery 307 can include an external re-chargeable battery with a power delivery rating sufficient for running the fan 312 and the light 310. The battery 307 can be trickle-charged from a USB port on the laptop 302. This necessitates that an extra degree of freedom be included in the form of an additional decision variable $u_{rch,i}$, which controls the charging of the external battery. The power rating at which this battery is charged is denoted by $P_{rch}$. As such, the discharge rate for the laptop battery is as follows:

$$P_{dch,i} = P_{comp,i} + u_{rch,i} \cdot P_{rch}$$

The total power drawn from the plug at time $t_i$ is still given by Equation (3), with the revised value of $P_{dch,i}$. Accordingly, the total energy cost over the optimization time window is given by:

$$J = \sum_{i=1}^{N} \eta_i \cdot u_{plug,i} \cdot [P_{ch,i} + P_{comp,i} + u_{rch,i} \cdot P_{rch}] \cdot \Delta T$$

The optimum charge/discharge policy is that which minimizes J over the decision variable space defined by $u_{plug,i}$ and $u_{rch,i}$, subject to the system dynamics defined by Equation (4) and the following constraints:

$$u_{plug,i} \in \{0, 1\},$$

$$u_{rch,i} \in \{0, 1\},$$

$$x_i \geq \frac{T_{res} \cdot (P_{comp,i} + P_{rch})}{E_{max}},$$

$$x_{bat,i} \geq \frac{T_{bat,res} \cdot P_{dev}}{E_{bat,max}}.$$

The last constraint pertains to the minimum charge level of the intermediate battery, and is analogous to the constraint for the laptop battery charge state. The minimum time for which the battery should be able to run the devices is given by $T_{bat,res}$, the energy capacity of the external battery is $E_{bat,max}$, and the power supplied is $P_{dev}$. The computational procedure for calculating optimal policies remains the same as detailed above, except for the fact that there are now two decision variables that can take two values each. Therefore, the number of decisions at each time step is four, and the worst-case number of computations is 4KN.

Further, the number of charging cycles is known to affect the life of Lithium-ion batteries. Accordingly, at least one embodiment of the invention assumes that each switch from charging to discharging, or vice versa, reduces the life of the battery by a fraction α. Switches in the charging decision can be penalized in the optimization algorithm by increasing the stage cost from time $t_{i-1}$ to $t_i$ by the same fraction α of the replacement cost of the battery. Assuming $u_{plug,0}=1$, the only change in the optimization formulation is a change of the objective function in Equation (5) to the following, wherein $C_{rep}$ represents the replacement of the battery:

$$J' = \sum_{i=1}^{N} \left( \eta_i \cdot u_{plug,i} \cdot [P_{ch} + P_{comp,i} + u_{dev,i} \cdot P_{dev}] + \underbrace{\frac{[(1 - u_{plug,i}) u_{plug,i-1} + u_{plug,i}(1 - u_{plug,i-1})]}{\text{XOR operation}}} \alpha C_{rep} \right) \Delta T$$

At least one embodiment of the invention also includes incorporating stochastic events, such as unscheduled power cuts or unplug events, within the framework detailed herein. In such an embodiment, the optimization algorithm accommodates stochastic models pertaining to such events when available. For example, a model for geographical regions with highly unpredictable power supply can include an assumption that power cuts happen as a Bernoulli process with parameter q. Therefore, every time interval $t_i$ can witness a loss of power with probability q. The power cost during this interval will likely be higher (for example, 18.54 monetary units per kilowatt-hour), and the deterministic cost factor in Equation (5) can then be replaced by the expected cost seen in any time period:

$$n'_i = (1-q) \cdot n_i + q \cdot 18.54.$$

The mathematical formulation described here can accommodate a time-varying power loss probability, and the dynamic nature of q can include a function of the time of day, or of the length of the forecast.

Incorporating unexpected unplug events poses a different challenge, because such events invalidate $u_{plug,i}=1$ decisions for the relevant periods $t_i$. The dynamic programming formulation can plan for such events using stochastic modelling of state transitions. Because stochasticity has the effect of introducing greater uncertainty in the forecast, it is expected that the effect would be an increase in the threshold for the minimum acceptable SOC. The precise changes will depend on the probability model for the unplug events.

Additionally, a software application that implements one or more embodiments of the invention (for example, a software application that can run on a laptop) features a reactive functionality, by responding in real-time to user events such as plugging and unplugging, and also to system events such as an unexpected drop in battery charge to below the minimum allowable threshold. Also, such a software application can be implemented in the form of a background operating system (OS) service. Further, an example software architecture can be comprised of various sub-components, such as depicted in FIG. 4.

Figure 4:
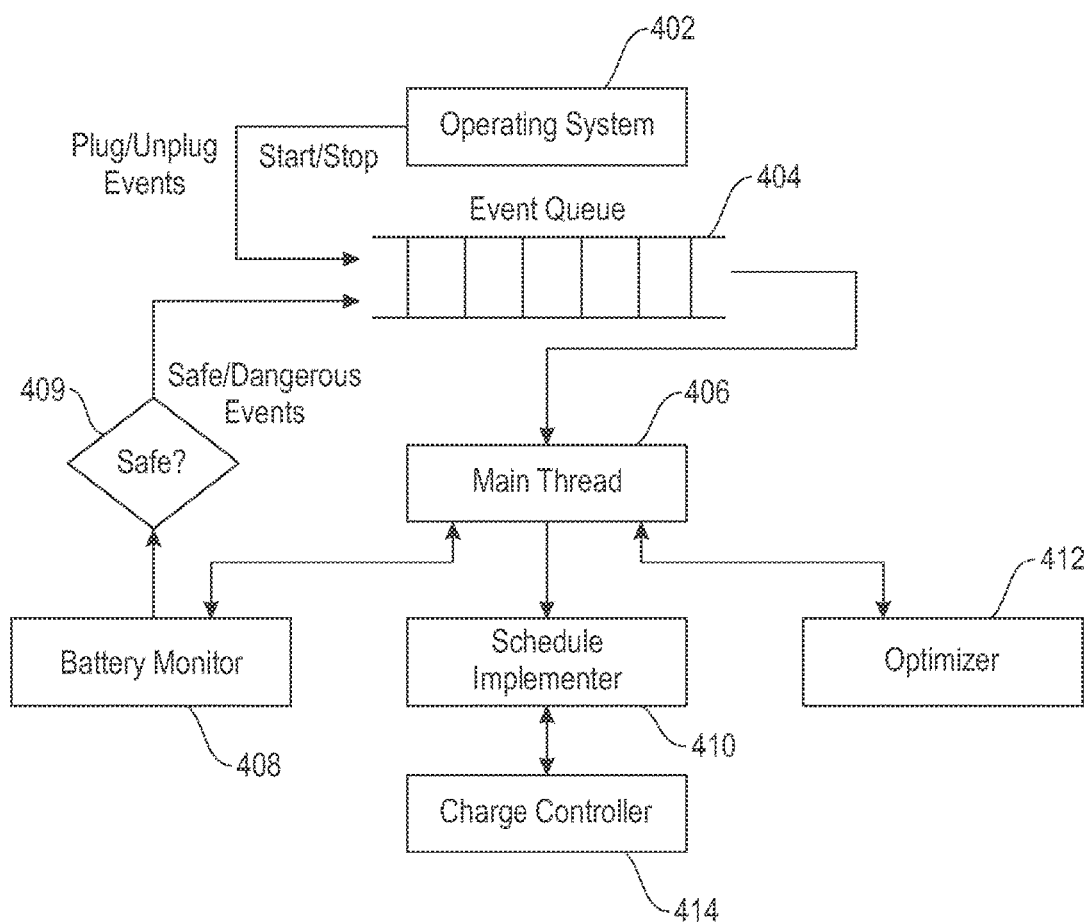
FIG. 4 is a diagram illustrating an example laptop battery charge management software system as per an example embodiment of the present invention.

FIG. 4 is a diagram illustrating an example laptop battery charge management software system as per an example embodiment of the present invention. By way of illustration, FIG. 4 depicts a battery monitor component 408, which tracks the state of the battery in an independent thread, and generates safe and dangerous events when necessary (as determined and/or identified via step 409). Additionally, an optimizer component 412 allows the optimization algorithm to be called by the main thread 406 whenever the event queue 404 determines that optimization is to be performed. The charge controller component 414 provides a programmable interface for switching the battery charging status on demand. The schedule implementation module 410 communicates with the charge controller component 414 to follow the schedule generated by the optimization algorithm. Additionally, the schedule can be paused and resumed based on system events (as derived from the operating system component 402) such as plugging, unplugging, sleep, hibernation, etc.

Example events to be handled can be classified as plug, unplug, start, stop, safe battery level and dangerous battery level events. The plug and unplug events are generated whenever the laptop is plugged into or unplugged from a physical power source. A plug event typically demands re-computation of the optimal schedule and therefore invokes the optimization algorithm. On the other hand, an unplug event pauses the schedule implementation module 410 and monitors the system status until the next plug event is generated. In order to prevent an excessive number of re-computation commands being generated in the case of rapid plug and unplug events, an inbuilt time threshold is incorporated into one or more embodiments of the invention, wherein this threshold is to be exceeded before a charging schedule expires following an unplug event.

A dangerous battery level event is generated by the battery monitor thread whenever the residual battery level falls below the minimum threshold defined by $T_{res}$. Upon receiving this event, the application suspends the schedule implementation module 410 and allows uninterrupted battery charging. A new optimal schedule is generated and implemented whenever the battery level returns to a safe value. Risks surrounding a dangerous battery level are safe-guarded against in one or more embodiments of the invention by using a conservative minimum time to discharge $T_{res}$, and by employing a model predictive control (MPC) methodology that involves periodic re-optimization.

Figure 5:
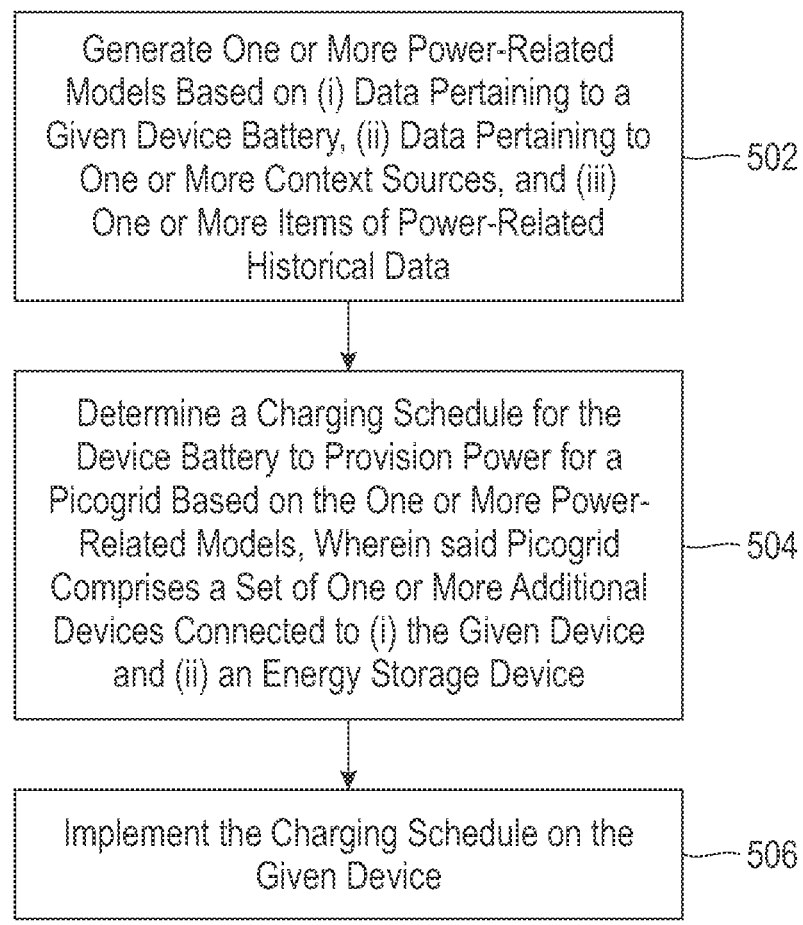
FIG. 5 is a flow diagram illustrating techniques according to an embodiment of the invention.

FIG. 5 is a flow diagram illustrating a device battery charge management technique according to an embodiment of the invention. Step 502 includes generating one or more power-related models based on (i) data pertaining to a given device battery, (ii) data pertaining to one or more context sources, and (iii) one or more items of power-related historical data. As detailed herein, the given device battery can include, for example, a laptop battery. The battery can also include a battery of a portable computing device with sufficient storage capacity to power the picogrid. Additionally, data pertaining to the given device battery can include data related to charge rate of the given device battery, data related to discharge rate of the given device battery, and/or capacity of the given device battery. Also, items of power-related historical data can include, for example, one or more historical power cut schedules and/or an energy price schedule.

Further, context sources can include, for example, one or more battery-related constraints, one or more user-related constraints, one or more user calendar entries as well as one or more user preferences. User preferences can include a lower bound on time before a complete discharge of the device battery, a scheduled time for ending use of the device battery, a scheduled time for beginning use of the device battery, an average state of charge of the device battery at the scheduled time for beginning use of the device battery, and/or an average duration of time for use of the device battery.

Step 504 includes determining a charging schedule for the given device battery to provision power for a picogrid based on the one or more power-related models (using, for example, the optimization methodology described herein), wherein said picogrid comprises a set of one or more additional devices connected to (i) the given device and (ii) an energy storage component (which can be resident on or incorporated in the given device). Step 506 includes implementing the charging schedule on the given device.

Additionally, at least one embodiment of the invention includes generating (i) a user computing device battery model, (ii) a user preferences model, and (iii) an energy pricing model based on data collected from multiple power-related sources, as well as determining a charging schedule for the user computing device battery to provision power for a picogrid based on (i) the user computing device battery model, (ii) the user preferences model, and (iii) the energy pricing model, wherein said picogrid comprises a set of one or more devices connected to the user computing device. Such an embodiment of the invention further includes implementing the charging schedule on the user computing device, and updating the charging schedule in response to one or more changed parameters. Also, the changed parameters can include, for example, a modeling error, user deviation from the charging schedule, a change in a projected energy price schedule, and/or passage of a predetermined amount of time. Further, in such an embodiment, determining and/or updating the charging schedule can be based on solving an optimization problem to minimize a projected cost of power consumed by the picogrid over a given period of time, subject to one or more battery-related constraints and/or one or more user-related constraints.

The techniques depicted in FIG. 5 can also, as described herein, include providing a system, wherein the system includes distinct software modules, each of the distinct software modules being embodied on a tangible computer-readable recordable storage medium. An exemplary embodiment of such a system is depicted in FIG. 4. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 6:
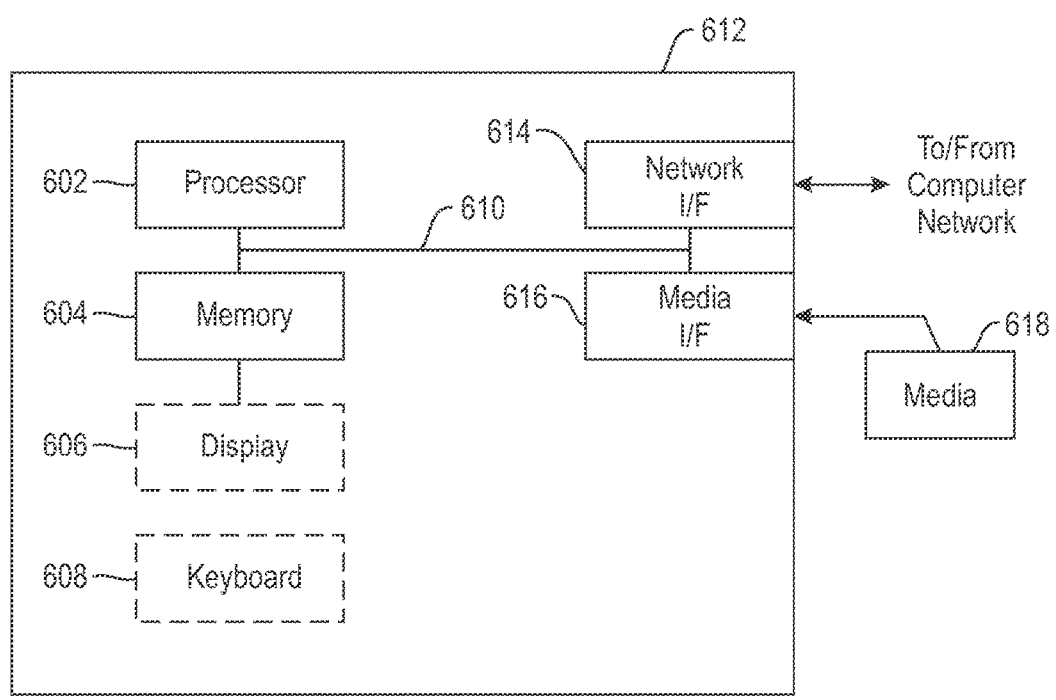
FIG. 6 is a system diagram of an exemplary computer system on which at least one embodiment of the invention can be implemented.

Additionally, an aspect of the present invention can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation. Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can to retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. At least one aspect of the present invention may provide a beneficial effect such as, for example, providing an intelligent charge management system to operate DC appliances driven by laptop batteries in a time-varying power pricing regime.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
generating one or more power-related models based on (i) data pertaining to a battery of a given device, (ii) data pertaining to one or more context sources, and (iii) one or more items of power-related historical data, wherein said one or more items of power-related historical data comprise an energy price schedule, and wherein said one or more context sources comprise user preferences comprising (a) a scheduled time for beginning use of the battery of the given device, (b) an average state of charge of the battery of the given device at the scheduled time for beginning use, and (c) an average duration of time for use of the battery of the given device;

determining a charging schedule for the battery of the given device to provision power for a picogrid based on the one or more power-related models, wherein the battery of the given device comprises a battery of a portable computing device with sufficient storage capacity to power said picogrid, and wherein said picogrid comprises a set of one or more additional devices connected to (i) the given device and (ii) an energy storage component; and implementing the charging schedule on the given device;

wherein said generating, said determining, and said implementing are carried out by at least one computing device.

2. The method of claim 1, wherein the battery of the given device comprises a laptop battery.

3. The method of claim 1, wherein said data pertaining to the given device battery comprise data related to a charge rate of the battery of the given device.

4. The method of claim 1, wherein said data pertaining to the battery of the given device comprise data related to a discharge rate of the battery of the given device.

5. The method of claim 1, wherein said data pertaining to the battery of the given device comprise a capacity of the battery of the given device.

6. The method of claim 1, wherein said one or more context sources comprise one or more user-related constraints.

7. The method of claim 1, wherein said user preferences comprise a lower bound on time before a complete discharge of the battery of the given device.

8. The method of claim 1, wherein said user preferences comprise a scheduled time for ending use of the battery of the given device.

9. The method of claim 1, wherein said one or more context sources comprise one or more battery-related constraints.

10. The method of claim 1, wherein said one or more items of power-related historical data comprise one or more historical power cut schedules.

11. A computer program product, the computer program product comprising a computer readable storage medium having program instructions embodied therewith, the program instructions executable by a computing device to cause the computing device to:

generate one or more power-related models based on (i) data pertaining to a battery of a given device, (ii) data pertaining to one or more context sources, and (iii) one or more items of power-related historical data, wherein said one or more items of power-related historical data comprise an energy price schedule, and wherein said one or more context sources comprise user preferences comprising (a) a scheduled time for beginning use of the battery of the given device, (b) an average state of charge of the battery of the given device at the scheduled time for beginning use, and (c) an average duration of time for use of the battery of the given device;

determine a charging schedule for the battery of the given device to provision power for a picogrid based on the one or more power-related models, wherein the battery of the given device comprises a battery of a portable computing device with sufficient storage capacity to power said picogrid, and wherein said picogrid comprises a set of one or more additional devices connected to (i) the given device and (ii) an energy storage component; and implement the charging schedule on the given device.

12. A system comprising:

a memory; and at least one processor coupled to the memory and configured for:

generating one or more power-related models based on (i) data pertaining to a battery of a given device, (ii) data pertaining to one or more context sources, and (iii) one or more items of power-related historical data, wherein said one or more items of power-related historical data comprise an energy price schedule, and wherein said one or more context sources comprise user preferences comprising (a) a scheduled time for beginning use of the battery of the given device, (b) an average state of charge of the battery of the given device at the scheduled time for beginning use, and (c) an average duration of time for use of the battery of the given device;

determining a charging schedule for the battery of the given device to provision power for a picogrid based on the one or more power-related models, wherein the battery of the given device comprises a battery of a portable computing device with sufficient storage capacity to power said picogrid, and wherein said picogrid comprises a set of one or more additional devices connected to (i) the given device and (ii) an energy storage component; and implementing the charging schedule on the given device.

13. The method of claim 1, comprising:

updating the charging schedule in response to one or more changed parameters.

14. The method of claim 13, wherein said one or more changed parameters comprise at least one of a modeling error, user deviation from the charging schedule, a change in a projected energy price schedule, and passage of a predetermined amount of time.

15. The method of claim 13, wherein said updating is based on solving an optimization problem to minimize a projected cost of power consumed by the picogrid over a given period of time, subject to at least one of (i) one or more battery-related constraints and (ii) one or more user-related constraints.

* * * * *